Oct. 22, 1957  R. E. LEWIS  2,810,363
INSTRUMENT ILLUMINATION
Filed Sept. 6, 1955

INVENTOR.
ROBERT E. LEWIS
BY Wade Krouty
Orlando L. McCoy AND
ATTORNEYS

United States Patent Office 2,810,363
Patented Oct. 22, 1957

2,810,363

INSTRUMENT ILLUMINATION

Robert E. Lewis, Chicago, Ill., assignor to the United States of America as represented by the Secretary of the Air Force Application September 6, 1955, Serial No. 532,811

2 Claims. (Cl. 116—129)

This invention concerns instruments having shaded or obscure parts to be viewed by an observer and more specifically to a means and a method for improving the illumination and hence the readability thereof.

Typical bank and turn indicator instruments for aircraft contain as a bank indicating device an inclinometer or an arcuate glass cylinder tube which is transparent and which contains an opaque ball immersed in a liquid. The liquid filled cylinder is optically refractive and is of such power that it converges incident light energy with the result that a considerable portion of the rear of the cylinder is shaded. The instrument also comprises a turn indicating hand which moves laterally with respect to a reference card to indicate changes in the aircraft heading.

The present invention provides means and methods for improving the illumination of and hence the readability of instruments of the aircraft bank and turn indicator type.

Illustrative embodiments of the present invention are shown in the accompanying drawing wherein.

Figure 1:
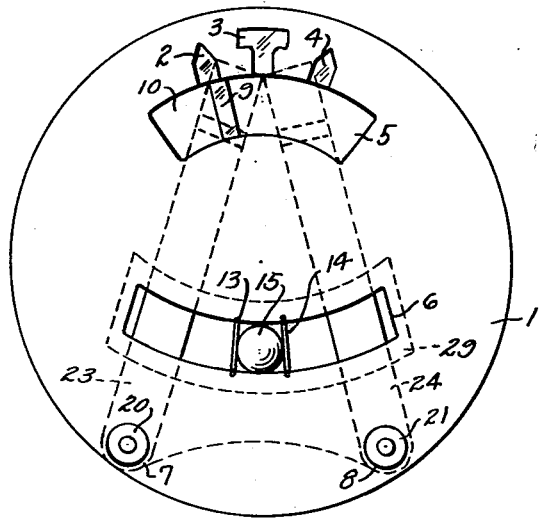
Fig. 1 is an elevational view of a bank and turn indicator instrument card and accessories which embody the present invention.

An aircraft bank and turn indicator instrument of the type contemplated hereby comprises a sheet metal card 1 which is apertured illustratively at 2, 3, 4, 5, 6, 7 and 8; a transparent turn indicating hand 9 midway between the ends of a sheet metal indicator 10 supported by a gyroscope actuated arm 11; and a bank indicating transparent arcuate fluid filled cylinder 12 bearing a pair of markers 13 and 14 bracketing laterally a fluid immersed ball 15 at a position midway between the opposite ends of the cylinder 12. The cylinder 12 has at one end a sealing nipple 16. A housing, not shown, incloses the assembly and associate parts not discussed herein and provides means by which the device is attached to an aircraft panel.

The bank indicator is a pendulous inclinometer comprising the arcuate cylinder or tube 12 and the commonly black glass ball 15 which moves against the damping action of the liquid within the tube. The bank indicator indicates movement of the aircraft about its longitudinal axis.

The bank indicator shows the lateral attitude of the aircraft in straight flight or in turns. In straight flight and in a perfectly banked turn the ball 15 remains between the markers 13 and 14 appearing on the inclinometer tube 12. The slipping of the aircraft toward the inside of the turn causes the ball 15 to move in the direction of the turn. The skidding of the aircraft toward the outside of the turn causes the ball 15 to move in the direction opposite to that produced by slipping.

The turn indicator of the instrument registers motion about the vertical axis of the aircraft. The indicator hand 9 is visible through the aperture 5 in the card 1. The turn indicator hand 9 is centered on the card 1 and is in registration with the card aperture 3 when the aircraft is flying straight ahead, disregarding drift, pitch and bank. When off center toward or in registration with either of the card apertures 2 or 4, the hand 9 indicates in direction and in amount a right or a left turn of the aircraft.

The present invention comprises a means and a method for improving the readability of the instrument portions associated with the card 1. In the older types of instruments, since the card 1 is made of steel, it impairs the illumination of parts of the instrument back of the card.

Figure 4:
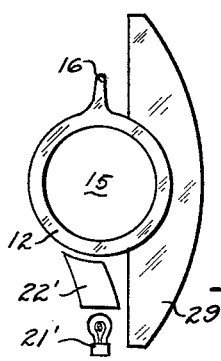
Fig. 4 is an enlarged fragmentary view of a modification of the arrangement in Fig. 2.

The bank indicator readability improving means contemplated hereby comprises the addition of a rectangular lens 29 mounted before and depressed to house a part of the inclinometer tube 12. The presence of the rectangular lens 29 in the line of sight before the tube 12 and ball 15 causes the convergence power of the inclinometer tube 12 to be compensated for by a means of lesser power. The lens 29 preferably is secured in place between a pair of upper and lower brackets 30 and 31 shown in Fig. 2 as being attached to the rear side of the steel card 1. A modification in this arrangement is represented in Fig. 4 wherein light energy from an outside source is materially reinforced by light from a light source 21′ transmitted from below by a transparent plastic block 22′.

The present invention instrument illumination improving means also comprises a suitable light source, such as that provided by light bulbs 20 and 21 mounted in the instrument through the apertures 7 and 8 in the metal card 1. Light conduction means mounted back of the card 1 comprises a base light guide 22 and a pair of upwardly extending light guide legs 23 and 24 secured at their lower ends to the base light guide 22.

The light guides 22, 23 and 24 illustratively are of transparent plastic or the like, for their optimum conduction of light energy from the light bulbs 20 and 21 positioned in apertures 25 and 26 in lateral ends of the base light guide 22 and adjacent the lower ends of the light guide legs 23 and 24. The upper ends of the legs 23 and 24 preferably are thinned at 27 and 28 to deflect and intensify light energy therein.

Figure 2:
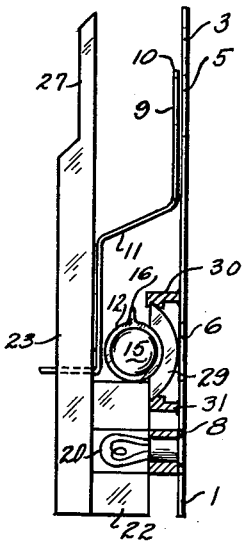
Fig. 2 is a side elevational view partially in section, of the assembly in Fig. 1 and parts adjacent thereto.
Figure 3:
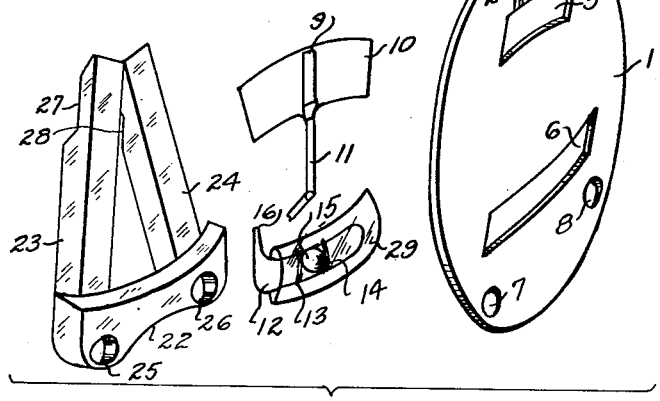
Fig. 3 is an exploded view of parts of the assembly in Fig. 1 shown in perspective.

The upper surface of the base light guide 22 preferably is curved to conform substantially with the lower surface of the inclinometer cylinder 12 for an optimum transfer of light energy therebetween in accomplishing a satisfactory illumination thereof. As shown in Fig. 2 of the drawing, the light guide members 22, 23 and 24 are mounted back of the steel, optically opaque card 1. The forward surface of the thinned upper ends of the legs 23 and 24 preferably are positioned substantially back of to illuminate the transparent hand 9 of the indicator 10 as well as to assist in the illumination of the center aperture 3 and the left and the right apertures 2 and 4, respectively, in the card 1. The light conductors 22, 23 and 24, so assembled and positioned conduct light energy from the light source bulbs 20 and 21 and materially improve the illumination of those parts of the instrument from which readings should be available at a glance.

The method contemplated hereby comprises the steps of using light conducting bodies for transmitting light energy from a light source into secluded and shaded areas in instruments and the supplementing in instruments of highly convergent light conductors with lenses of lesser convergency for improving the readability thereof.

It is to be understood that the shape and type of lens 29 and of light energy conductors 22, 23 and 24 which are disclosed herein are submitted as illustrative embodiments of the present invention and that similarly functioning other shapes and types of comparable devices may be substituted therefor within the scope of the present invention.

What I claim is:

1. An aircraft bank and turn indicating instrument containing a substantially transparent arcuate cylindrical tube and a substantially transparent indicator hand accessible for observation through apertures in an opaque card part of the instrument, comprising a lens of less converging power than the tube positioned before the tube and the lens depressed for the housing in the lens depression of at least a part of the tube, a light source mounted within as a part of the instrument, and light conducting means mounted within as a part of the instrument and transmitting light energy from the light source in a direction substantially parallel to and adjacent to the tube and conducting light energy from the light source to provide an illuminated background for the indicator hand for improving the degree of illumination therefor.

2. An aircraft bank and turn indicating instrument containing a substantially transparent arcuate cylindrical tube and a substantially transparent indicator hand accessible for observation through apertures in an opaque part of the instrument comprising a lens positioned before the tube and of a lesser convergence power than the convergence power of the tube and the lens being depressed for the housing in the lens depression of at least a part of the tube, a light source mounted within as a part of the instrument for purposes of illumination, and light conducting means mounted within as a part of the instrument and transmitting light energy from the light source in a direction substantially parallel to and adjacent to the tube and conducting light energy from the light source to provide an illuminated background for the indicator hand for improving the degree of illumination thereof, and applying the illuminating light energy in the direction which is substantially lateral to the illuminated instrument parts.

References Cited in the file of this patent

UNITED STATES PATENTS

| | | |
|---|---|---|
| 1,036,601 | Frank | Aug. 27, 1912 |
| 2,131,471 | Carter | Sept. 27, 1938 |
| 2,221,152 | Rylsky | Nov. 12, 1940 |
| 2,290,278 | Failla | July 21, 1942 |
| 2,367,858 | Flynn | Jan. 23, 1945 |

FOREIGN PATENTS

| | | |
|---|---|---|
| 534,813 | Great Britain | Mar. 19, 1941 |